United States Patent [19]

Schmidt

[11] 3,956,617

[45] May 11, 1976

[54] SYSTEM FOR INDICATING WHEN MAXIMUM MATERIAL SPEED FOR A PREDETERMINED BOARD LENGTH IS EXCEEDED IN A CORRUGATOR CUT-OFF MACHINE

[76] Inventor: Robert W. Schmidt, 5744 W. 77th St., Oak Lawn, Ill. 60459

[22] Filed: Jan. 27, 1975

[21] Appl. No.: 544,370

[52] U.S. Cl. ............................ 235/151.1; 83/74; 234/49; 235/92 DN; 235/92 PD
[51] Int. Cl.² .................... G05B 5/00; B26D 5/00
[58] Field of Search ....... 235/151.1, 92 CA, 92 MP, 235/92 PD, 92 DM, 177; 83/74, 76, 293, 295, 286; 234/49; 340/146.2

[56] References Cited
UNITED STATES PATENTS

| | | | |
|---|---|---|---|
| 3,355,973 | 12/1967 | Rubinstein et al. | 83/76 |
| 3,365,569 | 1/1968 | Hunter | 235/92 PD |
| 3,424,041 | 1/1969 | Giraud | 83/76 |
| 3,445,638 | 5/1969 | Montgomerie | 235/92 CA |
| 3,510,632 | 5/1970 | Strandberg | 235/92 DN |
| 3,668,957 | 6/1972 | Nido | 83/76 |
| 3,745,864 | 7/1973 | Watson | 83/295 |
| 3,750,603 | 8/1973 | Martin | 235/92 PD |
| 3,803,962 | 4/1974 | Koslow | 83/293 |
| 3,826,169 | 7/1974 | Schnell et al. | 83/74 |

Primary Examiner—Malcolm A. Morrison
Assistant Examiner—Errol A. Krass
Attorney, Agent, or Firm—Kinzer, Plyer, Dorn & McEachran

[57] ABSTRACT

A system for limiting maximum material speed for predetermined board length in a corrugator cut-off machine provides an output pulse for each increment of material movement. A divide circuit is connected to the pulse generating means and there are a plurality of gates, with each gate being placed in a predetermined condition for a predetermined range of board length. A counting circuit is connected to the gates and to the pulse generating means. The counting circuit compares material movement with a predetermined maximum speed for each range of board length and when material speed is greater than the predetermined speed, an output signal is provided which may be used to reduce the speed to a predetermined safe speed or to sound an alarm.

10 Claims, 1 Drawing Figure

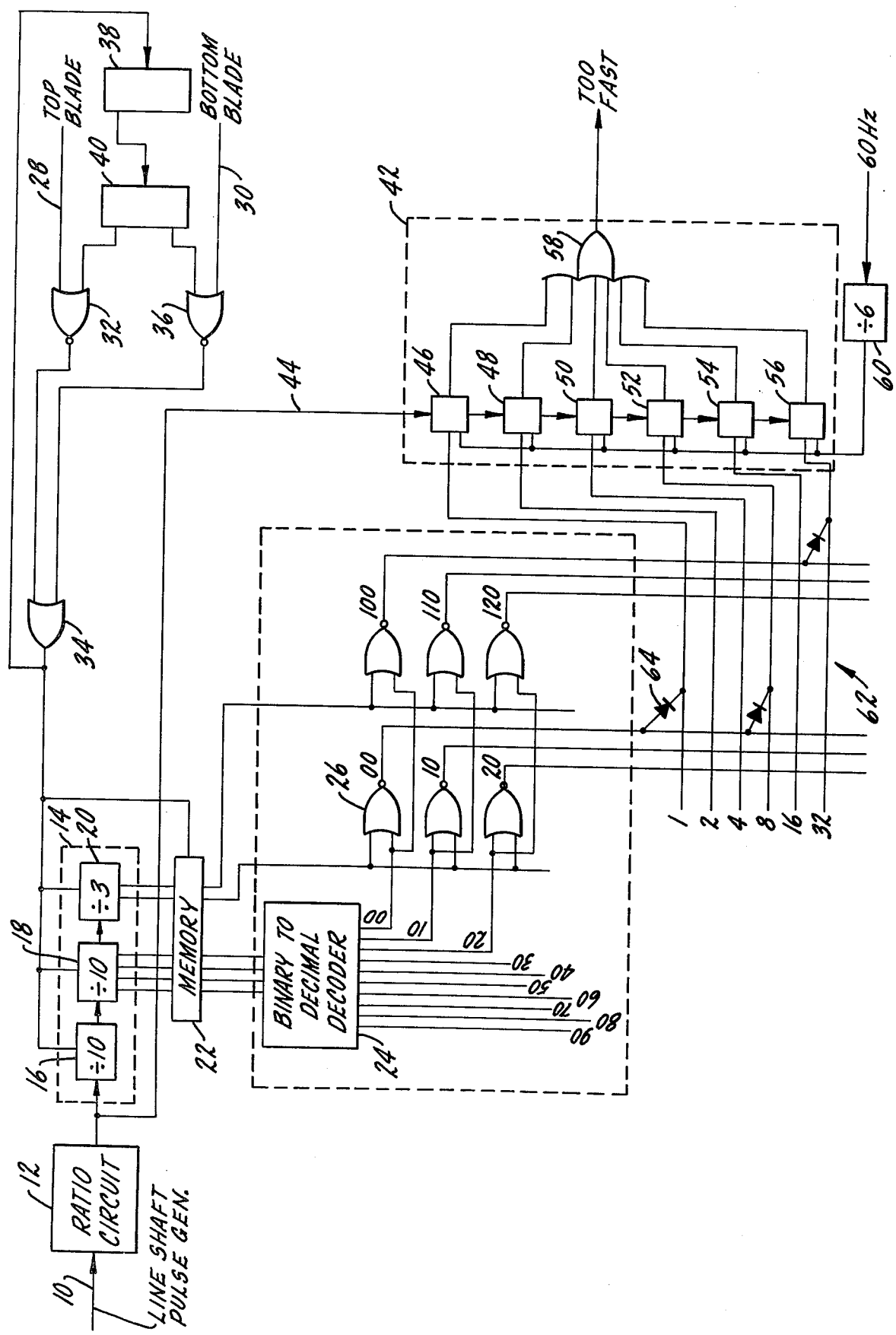

2

SYSTEM FOR INDICATING WHEN MAXIMUM MATERIAL SPEED FOR A PREDETERMINED BOARD LENGTH IS EXCEEDED IN A CORRUGATOR CUT-OFF MACHINE

SUMMARY OF THE INVENTION

The present invention relates to a system for limiting maximum material speed for predetermined board lengths in a corrugator cut-off machine.

A primary purpose of the invention is a system of the type described which is reliably operable.

Another purpose is a system of the type described utilizing a reliably operable counting circuit to compare actual material speed with a predetermined maximum material speed for any board length.

Another purpose is a system of the type described which limits the maximum material speeds for longer and shorter board lengths.

Other purposes will appear in the ensuing specification, drawing and claims.

BRIEF DESCRIPTION OF THE DRAWING

The invention is illustrated diagrammatically in the attached block diagram.

DESCRIPTION OF THE PREFERRED EMBODIMENT

Common three-element corrugated board is finished in a portion of a corrugator machine called the double facer and from there it passes through a slitter and from the slitter the separated board is run through either the top or bottom knife to be cut to the desired length for production orders. Both the double facer and the knife are driven by one motor, with the length being adjusted by interposing a Reeves variable speed drive between the drive motor and the cut-off knives. Since the line shaft which drives both the double facer and the knives is geared directly to the double facer, a fixed length of board leaves the double facer and enters the knife for each revolution of the line shaft. Accordingly, a pulse generator driven from the line shaft is used to provide a pulse which represents an exact increment of length of material movement.

If the knife path for one revolution is 60 inches, the knife will run at a constant speed when cutting a 60-inch long board. If the knife is to cut longer lengths than 60 inches, the knife moves at board speed while the cut is being made to avoid buckling or tearing of the sheet and, as soon as the knife blade clears the material, it must slow down below board speed in order to allow more board to pass under the knife to give the longer length. The reverse is true of short lengths when the knife must speed up in the interval when the blade is not engaged with the material to cut shorter lengths than 60 inches.

At very long and very short board lengths the cyclic acceleration and deceleration of the knife bars, which are usually steel shafts about 14 inches in diameter, require large forces and if the knife is operated at too high a speed and at very long or very short lengths, thus requiring rapid changes in speed and high accelerating forces, mechanical damage will result.

For this reason, manufacturers of equipment of this type determine safe speeds for various board lengths. The present invention is particularly directed to limiting the maximum speed for particular board lengths to those recommended by the manufacturer.

In the drawing, the line shaft pulse generator output is indicated at 10 and is connected to a ratio circuit 12 which will provide an output pulse for each increment of board length, for example one pulse per inch. The output from the ratio circuit 12 is connected to a divide circuit, indicated generally at 14, and including a divide by 10 circuit 16, a second divide by 10 circuit 18, and a divide by 3 circuit 20.

The outputs from divide by 10 circuit 18 and divide by 3 circuit 20 are connected to a memory 22, with outputs from memory 22 representative of the outputs of divide by 10 circuit 18 being connected to a binary to decimal decoder 24.

Utilizing the particular example of a system which can cut lengths anywhere from 10 to 300 inches, there will be 30 separate NOR gates connected to decoder 24, each of which is indicated at 26. Although only six such gates have been shown, it should be clear that each gate will cover a board length range of ten inches and thus there will be 30 gates to cover a 300-inch range of board lengths. There will be 10 outputs from the binary to decimal decoder 24, with each output going to three different gates. There will be two outputs from divide by 3 circuit 20, with these outputs being connected to the 30 gates in such a manner that each gate will cover a board length range of ten inches, as indicated by the numbers at the output terminals of each of the NOR gates 26. Thus, a NOR gate will be placed in a condition to provide an output voltage level, for example 5 volts, when the divide circuit 14 in cooperation with the binary to decimal decoder 24 provides output signals to the NOR gates, at the moment of cut, indicating that a particular amount of material movement has taken place since time zero.

The blades which cut the corrugated board will have sensing means associated with them and the signal from the top blade sensor will be received on line 28 and the signal from the bottom blade sensor will be received on line 30. The signal from line 28 will go to a NOR gate 32 whose output is connected to an OR gate 34. In like manner, the signal from bottom blade line 30 will go to a NOR gate 36 whose output will go to OR gate 34. A first flip-flop is indicated at 38 and a second flip-flop is indicated at 40. The output from OR gate 34 will provide reset signals for the divide circuit 14, as well as providing a stroke signal for memory 22.

A counting circuit is indicated generally at 42 and is connected by line 44 to the ratio circuit 12 such that the counting circuit has an input of one pulse for each inch of material movement. A plurality of bistable circuits or flip-flops are indicated at 46 through 56, respectively, and each have their outputs connected to an OR gate 58, which will provide a signal indicating that the material speed is exceeding the predetermined maximum for a particular board length. The flip-flops 46–56 are connected in binary form and each receive an input from a divide by 6 strobe circuit 60. A 60 hz signal, for example power line frequency, is provided for the divide circuit 60 such that there will be an output pulse every 0.1 second, which output pulse will strobe or activate each of the bistable circuits 46–56.

A diode matrix, indicated generally at 62, is connected between gates 26 and flip-flops 46 through 56. There are six binary lines designated 1, 2, 4, 8, 16 and 32, which are each connected to flip-flops 46 through 56. Diodes 64 will be connected between certain lines and the outputs of certain gates. It is not necessary to provide a maximum speed for every board length, but, as brought out above, it is necessary for long and short board lengths where there is a possibility of damaging the knives due to overly rapid acceleration and deceleration. Thus, for certain board lengths there will be diodes 64 connected between the output from a NOR gate 26 and a particular diode matrix binary input line or lines.

In operation, assume that a board length of 200 inches is to be cut, and that the maximum permissible material speed for that length of the board is 400 feet per minute. There will be an output pulse from ratio circuit 12 at the rate of one pulse per 1 inch of material movement. The pulses will accumulate in divide circuit 14 until there is a strobe signal from gate 34 indicating a cut has taken place. The count from divide circuit 14 will pass to memory 22 and change the count in the memory if it is different from the previously-stored count. This same count will cause the one of gates 26 representative of 200 inches to go to a high output voltage level. Each successive cut signal from gate 34 will repeat the above series of steps. If board length changes, then a new count will be stored in the memory and a different gate 26 will go to a high voltage level.

Since the diode matrix has been pre-programmed to provide a maximum material speed of 400 feet per minute, or 80 inches per second at a board length of 200 inches, the particular diode 64 associated with the gate controlling the board length range of 200 inches would have connections to the binary 8 line in the diode matrix 62. Thus, every 0.1 second flip-flop 52 associated with the binary 8 line will be operated. From that point on, pulses from the ratio circuit 12 would begin counting down the number 8 set into the counting circuit 42. If the number 8 is counted out of circuit 42 before the next strobe pulse, it is an indication that material speed is too high and there would be an output signal from OR gate 58. Thus, the particular gate placed in an operable condition will indicate board length. If there is a maximum speed for that board length, and there will not be for every board length, then the diode or diodes associated with the gate will place voltages on predetermined lines in the diode matrix 62, which will then provide voltage levels for predetermined ones of the flip-flops 46 through 56. At the next point in time, when these bistables or flip-flops are strobed by an output from divide circuit 60, the voltage levels will place the bistables in a particular operable condition. From that point on, pulses from ratio circuit 12 will begin counting down. If the number placed in binary form in the bistable circuit is counted down to zero before the next strobe pulse, there will be an output from OR gate 58, indicating that the material speed is exceeding the maximum limit.

In order to provide protection for both knife cyclic mechanisms, signals are taken from both the top blade and the bottom blade. The first signal will come from the top blade, pass through NOR gate 32, NOR gate 34, and then will reset divide circuit 14 and memory 22. The reset signal also returns to flip-flop 38 and places it in a predetermined condition. The next signal from the top blade will act in the same manner, however, in this case the reset signal will cause flip-flop 40 to be placed in a different condition such that the succeeding signal will operate from the bottom blade and not from the top blade.

Whereas the preferred form of the invention has been shown and described herein, it should be realized that there may be many modifications, substitutions and alterations thereto.

The embodiments of the invention in which an exclusive property or privilege is claimed are defined as follows:

1. A system for indicating when maximum material speed for predetermined board length is exceeded in a corrugator cut-off machine, including means for providing an output pulse for each increment of material movement, divide circuit means connected to said pulse means, a plurality of gates connected to said divide circuit means, with each gate being placed in a predetermined condition at a predetermined range of board length, material speed comparison means connected to said pulse means, circuit means connected between said gates and said comparison means for providing a signal representative of maximum material speed for a predetermined range of material movement said comparison means including means for comparing said signal representative of maximum material speed with the output of said pulse means, over a predetermined interval, and providing an output signal when the number of pulses from said pulse means during said interval exceeds the signal representative of maximum material speed.

2. The system of claim 1 further including a binary to decimal decoder connected between said divide circuit means and said gates.

3. The system of claim 1 further including means for providing a signal representative of a cutting operation in said corrugator cut-off machine, said cutting signal being connected to said divide circuit means for providing a reset signal.

4. The system of claim 1 wherein said circuit means connected between said gates and said comparison means includes a diode matrix.

5. The system of claim 1 wherein said comparison means includes a plurality of bistable circuits interconnected in a binary manner, and wherein a diode matrix is connected between said gates and said plurality of bistable circuits.

6. The system of claim 5 further including means for periodically setting a maximum material speed count in said plurality of bistable circuits.

7. The system of claim 1 further including a memory connected between said divide circuit and said plurality of gates, means for providing a signal representative of a cutting operation by said corrugator cut-off machine and means for connecting said cutting signal to said divide circuit for resetting said divide circuit at each corrugator cut-off operation, said reset signal being connected to said memory.

8. A system for indicating when maximum material speed for predetermined board length is exceeded in a corrugator cut-off machine including means for providing an output pulse for each increment of material movement, a plurality of gates connected to said pulse means, with each gate being placed in a predetermined condition at a predetermined range of board length, material speed comparison means connected to said pulse means, circuit means connected between said gates and said comparison means for providing a signal representative of maximum material speed for a predetermined range of material movement, said comparison means including means for comparing said signal representative of maximum material speed with the output of said pulse means, over a predetermined interval, and providing an output signal when the number of pulses from said pulse means, during said interval, exceeds the signal representative of maximum material speed.

9. The system of claim 8 wherein said circuit means provides a signal representative of maximum material speed in binary form, said comparison means comparing said binary signal with the count of pulses from said pulse means during said interval.

10. The circuit of claim 8 wherein said comparison means includes a plurality of bistable circuits.

* * * * *